United States Patent [19]
Roberts et al.

[11] Patent Number: 5,987,525
[45] Date of Patent: Nov. 16, 1999

[54] NETWORK DELIVERY OF INTERACTIVE ENTERTAINMENT SYNCHRONIZED TO PLAYBACK OF AUDIO RECORDINGS

[75] Inventors: Dale Tyson Roberts, Sausalito; Ann E. Greenberg, San Anselmo, both of Calif.

[73] Assignee: CDDB, Inc., Carmel, Ind.

[21] Appl. No.: 08/838,082

[22] Filed: Apr. 15, 1997

[51] Int. Cl.⁶ .............................. G06F 13/00; H04N 5/50
[52] U.S. Cl. ...................... 709/248; 709/237; 709/236; 709/232
[58] Field of Search ................... 395/200.47, 200.78, 395/200.6; 709/248, 237, 236, 232

[56] References Cited

U.S. PATENT DOCUMENTS

| | | | |
|---|---|---|---|
| 5,721,827 | 2/1998 | Logan et al. | 395/200.47 |
| 5,774,664 | 6/1998 | Hidary et al. | 395/200.48 |
| 5,778,181 | 7/1998 | Hidary et al. | 395/200.48 |
| 5,778,187 | 7/1998 | Monteiro et al. | 395/200.61 |
| 5,796,393 | 8/1998 | MacNaughton et al. | 345/329 |
| 5,796,952 | 8/1998 | Davis et al. | 395/200.54 |
| 5,809,250 | 9/1998 | Kisor | 395/200.57 |
| 5,809,512 | 9/1998 | Kato | 707/502 |

FOREIGN PATENT DOCUMENTS

| | | |
|---|---|---|
| 194 143 | 9/1986 | European Pat. Off. |
| WO97/05616 | 2/1997 | WIPO |

OTHER PUBLICATIONS

M. Mascha et al. "Interactive education: Transistioning CD–ROMs to the Web" *Computer Network and ISDN Systems*, vol. 27, No. 2, Nov. 1994, pp. 267–272.
International Search Report for PCT/US 98/07660 mailed Nov. 26, 1998.

*Primary Examiner*—Krisna Lim
*Attorney, Agent, or Firm*—Staas & Halsey, LLP

[57] ABSTRACT

Entertainment content complementary to a musical recording is delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

1 Claim, 3 Drawing Sheets

NETWORK DELIVERY OF INTERACTIVE ENTERTAINMENT SYNCHRONIZED TO PLAYBACK OF AUDIO RECORDINGS

BACKGROUND

1. Field of the Invention

This invention pertains to the field of computer networking, and more particularly to the use of network protocols to provide services to users which are related to audio recordings.

2. Related Art

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfil this promise.

SUMMARY OF THE INVENTION

It is therefore an object of this invention to provide computer programs, systems, and protocols which allow producers to deliver entertainment complementary to musical recordings by means of on-line services such as the Internet. It is a further object of this invention to provide computer programs, systems, and protocols which allow such complementary entertainment to be meaningfully interactive for the consumer, such that the consumer can also be a creator of the experience.

It is a further object of the invention to achieve the foregoing objects by means of implementations designed to attain integration with existing environments and programs, particularly on the Internet, while retaining the flexibility to adapt to the continuing evolution of standards for on-line services.

In one aspect of the invention, software is provided which permits a computer program running on a remote host to control a compact disk (CD) player, DVD player, or the like on a user's computer. (For convenience, we use the term "CD player" to refer also to DVD players and similar devices.) The software is designed to permit the remote host both to initiate actions on the CD player and to become aware of actions which the user has initiated by other control means, such as the buttons on the CD'player's front panel or a different CD player control program. This aspect of the invention is a building-block for the provision of complementary entertainment for musical recordings when those recordings are fixed in the prevailing contemporary form, the audio CD.

In a second aspect of the invention, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect of the invention, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the *Rosary Sonatas* of Heinrich Ignaz Franz Biber, it would presumably not function well if the CD in the user's player were the soundtrack for the film *Mary Poppins*. The unique identifier also allows a CD to be used as a key to access a premium Web area. Furthermore, the unique identifier can allow the user to be directed to an area of the Web corresponding to the CD which is in the user's machine.

In a fourth aspect of the invention, the immensely popular on-line service generally referred to as a "chat room" may be enhanced by means of a link to a musical recording to which all persons in the room are listening. The chat room experience as it exists today in on-ine services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by means of shared interests in a particular type of recording.

DESCRIPTION OF PREFERRED EMBODIMENTS

1. Introduction

The preferred embodiment of this invention operates on the World Wide Web. The software implementation environment provided by the World Wide Web is described in a number of books, for example, John December & Mark Ginsburg, *HTML 3.2 and CGI Unleashed* (1996). The World Wide Web is based on a network protocol called HTTP (hypertext transfer protocol), which is described in T. Berners-Lee et al., *Hypertext Transfer Protocol—HTTP*/1.0 (Internet Request for Comments No. 1945, 1996). The HTTP protocol must be run atop a general connection-oriented protocol, which today is generally TCP/IP, described in Douglas E. Comer, *Internetworking with TCP/IP* (3d ed. 1995). However, the invention described here is not limited to HTTP running over any particular kind of network software or hardware. The principles of the invention apply to other protocols for access to remote information that may come to compete with or supplant HTTP.

Figure 1:
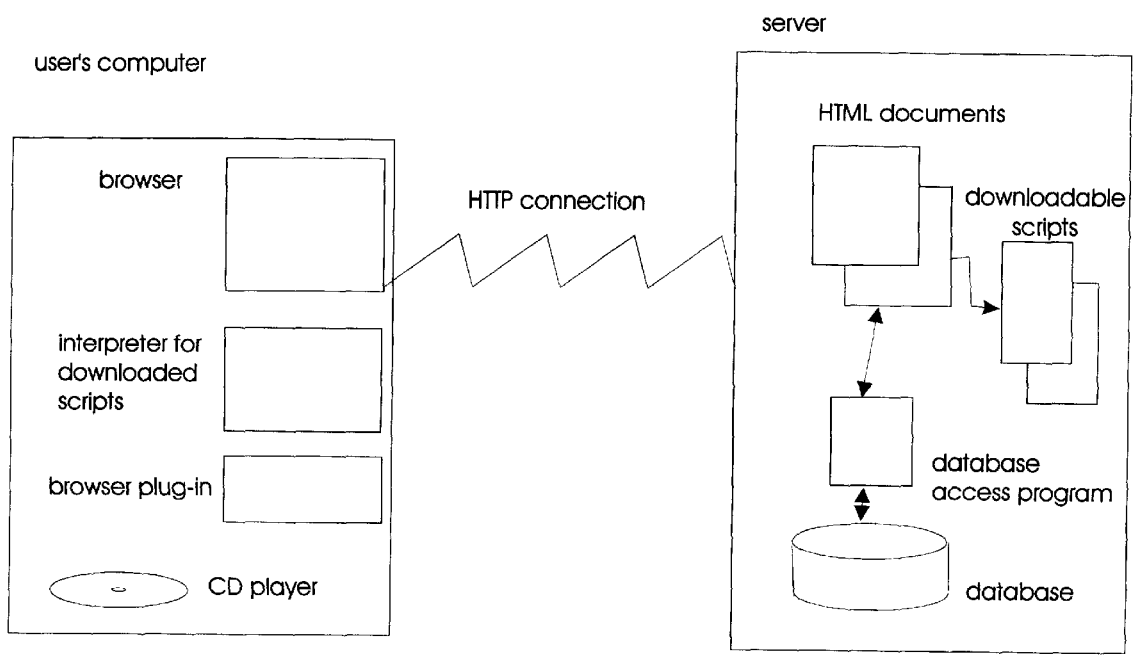
FIG. 1 is a block diagram of the environment in which the preferred embodiment operates.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by means of uniform resource locators (URL's), character strings in a particular format defined in Berners-Lee et al., *supra*. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the user's prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by means of code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used in connection with the invention is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

2. Command Plug-In

A preferred embodiment of the invention employs a plug-in, referred to as the command plug-in, which provides to a scripting language the ability to command in a detailed fashion the playing of a musical recording. The command plug-in should provide, at a minimum, the following basic functions:

(1) Start and stop play.

(2) Get current track and position within the track.

(3) Seek to a track and a position within the track.

(4) Get and set volume.

(5) Get information regarding the CD (e.g., the number of tracks, their lengths, the pauses between tracks).

(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in *Microsoft Win32 Programmer's Reference*. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write ActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

3. Synchronization

The existence of a command plug-in providing the functions listed above to a scripting language is a foundation on which entertainment complementary to a musical recording may be constructed. In particular, it is possible to devise, building on this foundation, a method for synchronizing the display of visual content by means of the scripting language with the events which are occurring on the audio CD.

In a preferred embodiment of the invention, the synchronization of the visual content to the audio CD proceeds as follows. The visual content is provided by means of a Shockwave animation, which is downloaded from the server and displayed for the user by means of a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by means of the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed, or because the user has fast forwarded the CD.

Figure 2:
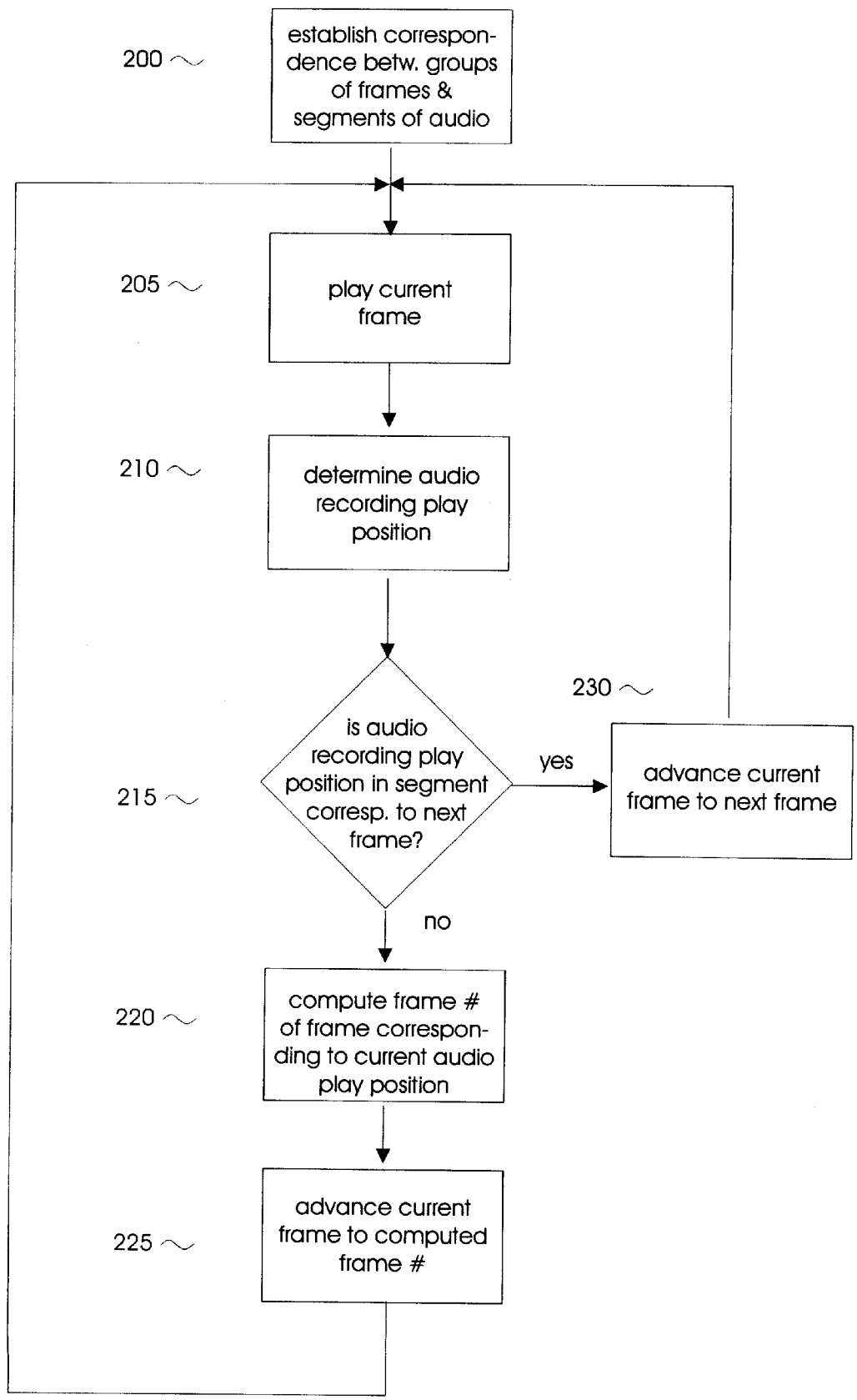
FIG. 2 is a flowchart of the synchronization code of the invention.

In a variant form of this synchronization algorithm (shown in FIG. 2), the frames of the animation are arranged into groups of contiguous frames. A correspondence is established between each such group of frames and a particular segment of the audio recording (box 200 in FIG. 2). At the end of each frame of the animation, the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

4. Unique Identifiers for Audio CDs

A further aspect of the invention is the ability, by malting use of the command plug-in, to provide a technique for establishing a unique identifier for an audio CD which is located in the user's CD player. The unique identifier may be based on the number and lengths of the tracks (measured in blocks, i.e., ⅟₇₅ths of a second), so that the identifier would be a concatenation of these lengths. In practice, however, it is desirable to have a somewhat shorter identifier, so the unique identifier is preferably the concatenation of the track lengths expressed in a fairly coarse unit, such as ¼th of a second.

Appendix A contains source code, written in C, for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2^8=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Append ontains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier of the invention is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives a URL, and (iii) the browser does an HTTP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by means of a script which invokes the functions provided by the command plug-in and computes a unique identifier.

5. Chat Rooms Connected With Musical Recordings

A third aspect of the invention is the connection of chat rooms with musical recordings. The goal is to provide all participants in a chat room with the same music at approximately the same time.

The prevailing network protocol for chat services is Intemey Relay Chat (IRC), described J. Oikarinen & D. Reed, *Internet Relay Chat Protocol* (Internet Request for Comments No. 1459, 1993). In this protocol, when one becomes a client of a chat server, one sends the name of a chat room. The chat server receives messages from all of its of clients and relays the messages sent in by one client to all the other clients connected in the same room as that client.

The messages which a client sends are typically typed in by the user who is running the client, and the messages which a client receives are typically displayed for the user who is running the client to read.

Figure 3:
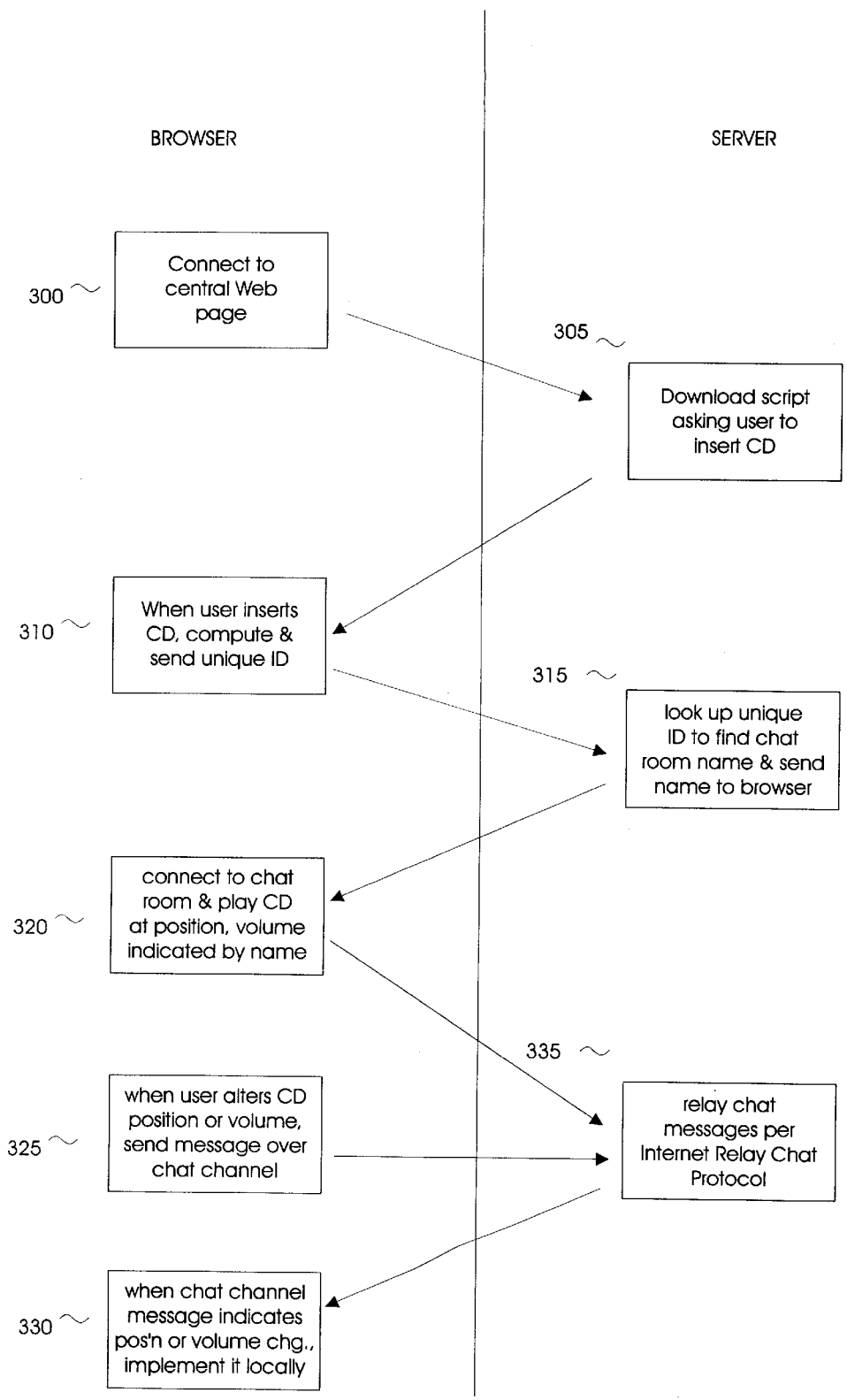
FIG. 3 is a flowchart of the sequence of operations for connection to a chat room focused on a musical recording.

In a preferred embodiment of the invention, a chat client is customized by means of a plug-in, which we will call the chat plug-in. The chat client is started up by a browser as follows (see FIG. 3). The user connects by means of the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, *supra*, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients'machines and the time at which the track started to play, as well as about the volume at which the CD is playing. The chat client plug-in employs that information to direct the control plug-in to set the CD in the user's. computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect of the invention, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect of the invention the messages delivered to the users of a chat can be driven from a text file rather than manual typing. This would allow a pre-recorded experience to be played back for a group of chat users. Such a technique may be used to create a pre-recorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-in and in the central Web page, with its connection to a database of CD information.

APPENDIX A

```
/*
 * FUZZY CD ID
 * (c) 1996 ION
 *
 *
 * by Ty Roberts
 */
#include <stdio.h>
#include <stdlib.h>
#include <time.h>
struct fuzzyCDid {
    short            numTracks;    // start time in milliseconds
    unsigned short   fuzzlength[100];
};
typedef struct fuzzyCDid fuzzyCDid, *fuzzyCDidPtr;
// structure of a cd track with all times stored in milliseconds
struct cdtrack {
    long    beginMs;    // start time in milliseconds
    long    endMs;      // end time in milliseconds
    long    lengthMs;   // length in milliseconds
};
typedef struct cdtrack cdtrack, *cdTrackPtr;
struct cd {
    short   numTracks;
    cdtrack  track[100];
};
typedef struct cd cd, *cdPtr;
void CreateFuzzyId( fuzzyCDidPtr fid, cdPtr cd );
float FuzzyMatch( fuzzyCDidPtr fid1, fuzzyCDidPtr fid2 );
// SUBROUTINES
void CreateFuzzyId( fuzzyCDidPtr fid, cdPtr cd )
{
    long  i;
    // first copy in the number of tracks
    fid->numTracks = cd->numTracks;
    for(i=0;i<fid->numTracks;i++) {
        // shift left and create a MSB length thats not exact
        fid->fuzzlength[i] = (short)(cd->track[i].lengthMs>>8);
    }
}
float  FuzzyMatch( fuzzyCDidPtr fid1, fuzzyCDidPtr fid2 )
{
    long   fidmatcherr = 0, fidmatchtotal = 0;
    short  i, trackcnt;
    float  matchpercent;
    // find the larger number of tracks
    trackcnt = fid1->numTracks<fid2->numTracks ? fid2->numTracks : fid1->numTracks;
    // cycle thru the tracks accumulating error and total comparedtimes
    for(i=0;i<trackcnt;i++) {
        if ((i < fid1->numTracks) && (i < fid2->numTracks)) {
            fidmatcherr += abs(fid1->fuzzlength[i] -
                fid2->fuzzlength[i]);
            fidmatchtotal += fid1->fuzzlength[i];
        } else if (i >= fid2->numTracks) {
            fidmatcherr += fid1->fuzzlength[i];
            fidmatchtotal += fid1->fuzzlength[i];
        } else if (i >= fid1->numTracks) {
            fidmatcherr += fid2->fuzzlength[i];
            fidmatchtotal += fid2->fuzzlength[i];
        }
    }
    if (fidmatcherr > 0) {
        matchpercent = 100 - (((float)fidmatcherr/
            (float)fidmatchtotal) *100);
    } else {
        matchpercent = 100;
    }
    return matchpercent;
}
void main(void)
{
    short i;
    float   matchpercent;
    // create global structures for two complete cds with up to 100 tracks
    cd    cd2id;
    fuzzyCDid fidcd2id;
    cd    cdFromDB;
```

APPENDIX A

```
fuzzyCDid fidcdFromDB;
printf ("Test #1 will compare two CDs that are exactly the
same\n\n");
// put in some test values for the cd track lengths
// since these are in ms, its basically 60000 = 1 minute
cd2id.track[0].lengthMs = 121323;
cd2id.track[1].lengthMs = 234565;
cd2id.track[2].lengthMs = 566437;
cd2id.track[3].lengthMs = 245120;
cd2id.track[4].lengthMs = 20000;
cd2id.track[5].lengthMs = 120386;
cd2id.track[6].lengthMs = 323453;
cd2id.numTracks = 7;
for(i=1;i<cd2id.numTracks;i++) {
    printf ("CD #1: Track = %d length in minutes = %f\n",
        i, (float)cd2id.track[i].lengthMs/60000.0);
}
printf("\n");
cdFromDB.track[0].lengthMs = 121323;
cdFromDB.track[1].lengthMs = 234565;
cdFromDB.track[2].lengthMs = 566437;
cdFromDB.track[3].lengthMs = 245120;
cdFromDB.track[4].lengthMs = 20000;
cdFromDB.track[5].lengthMs = 120386;
cdFromDB.track[6].lengthMs = 323453;
cdFromDB.numTracks = 7;
for(i=1;i<cdFromDB.numTracks;i++) {
    printf ("CD #2: Track = %d length in minutes = %f\n",
        i, (float)cdFromDB.track[i].lengthMs/60000.0);
}
CreateFuzzyId( &fidcd2id, &cd2id );
CreateFuzzyId( &fidcdFromDB, &cdFromDB );
matchpercent = FuzzyMatch( &fidcd2id, &fidcdFromDB );
printf ("The cd's matchpercent was computed as=%f", matchpercent);
printf ("\n");
printf ("\n");
printf ("Test #2 will compare two cd that are nearly the same\nexcept
they have
diffent # of tracks \n");
// put in some test values for the cd track lengths
// since these are in ms, its basically 60000 = 1 minute
cd2id.track[0].lengthMs = 121323;
cd2id.track[1].lengthMs = 234565;
cd2id.track[2].lengthMs = 566437;
cd2id.track[3].lengthMs = 245120;
cd2id.track[4].lengthMs = 20000;
cd2id.track[5].lengthMs = 120386;
cd2id.track[6].lengthMs = 323453;
cd2id.numTracks = 7;
for(i=1;i<cd2id.numTracks;i++) {
    printf ("CD #1: Track = %d length in minutes = %f\n",
        i, (float)cd2id.track[i].lengthMs/60000.0);
}
printf ("\n");
cdFromDB.track[0].lengthMs = 121323;
cdFromDB.track[1].lengthMs = 234565;
cdFromDB.track[2].lengthMs = 566437;
cdFromDB.track[3].lengthMs = 245120;
cdFromDB.track[4].lengthMs = 20000;
cdFromDB.track[5].lengthMs = 120386;
cdFromDB.numTracks = 6;
for(i=1;i<cdFromDB.numTracks;i++) {
    printf ("CD #2: Track = %d length in minutes = %f\n",
        i, (float)cdFromDB.track[i].lengthMs/60000.0);
}
CreateFuzzyId( &fidcd2id, &cd2id );
CreateFuzzyId( &fidcdFromDB, &cdFromDB );
matchpercent = FuzzyMatch( &fidcd2id, &fidcdFromDB );
printf ("The cd's matchpercent was computed as=%f",matchpercent);
printf ("\n");
printf ("\n");
printf ("Test #3 will compare two cd that are not the same\n\n");
// put in some test values for the cd track lengths
// since these are in ms, its basically 60000 = 1 minute
cd2id.track[0].lengthMs = 34213;
cd2id.track[1].lengthMs = 334565;
cd2id.track[2].lengthMs = 231423;
cd2id.track[3].lengthMs = 134122;
cd2id.track[4].lengthMs = 2342;
cd2id.track[5].lengthMs = 3487;
cd2id.track[6].lengthMs = 9976;
cd2id.numTracks = 7;
for(i=1;i<cd2id.numTracks;i++) {
    printf ("CD #1: Track = %d length in minutes = %f\n",
        i, (float)cd2id.track[i].lengthMs/60000.0);
}
printf ("\n");
cdFromDB.track[0].lengthMs = 121323;
cdFromDB.track[1].lengthMs = 234565;
cdFromDB.track[2].lengthMs = 566437;
cdFromDB.track[3].lengthMs = 245120;
cdFromDB.track[4].lengthMs = 20000;
cdFromDB.track[5].lengthMs = 120386;
cdFromDB.track[6].lengthMs = 323453;
cdFromDB.numTracks = 6;
for(i=1;i<cdFromDB.numTracks;i++) {
    printf ("CD #2: Track = %d length in minutes = %f\n",
        i, (float)cdFromDB.track[i].lengthMs/60000.0);
}
CreateFuzzyId( &fidcd2id, &cd2id);
CreateFuzzyId( &fidcdFromDB, &cdFromDB);
matchpercent = FuzzyMatch( &fidcd2id, &fidcdFromDB );
printf ("The cd's matchpercent was computed as=%f",matchpercent);
}
```

APPENDIX B

```
/*
* EXACT MATCH CD ID
* - 1996 ION
*
*
* by Ty Roberts
*/
#include <stdio.h>
#include <stdlib.h>
#include <time.h>
struct cdid{
    long   id[2];
```

APPENDIX B-continued

```c
};
typedef struct cdid cdid, *cdidPtr;
// structure of a cd track with all times stored in milliseconds
struck cdtrack{
        long    beginMs;            // start time in milliseconds
        long    endMs;              // end time in milliseconds
        long    lengthMs;           //length in Milliseconds
};
typedef struct cdtrack cdtrack, *cdPtr;
struct cd {
        short   numTracks;
        cdtrack         track[100];
};
typedef struct cd cd, *cdPtr;
void CreateUniqueId( cdidPtr cid, cdPtr cd );
//SUBROUTINES
void CreateUniqueId( cdidPtr cid, cdPtr cd )
{
        long            i, t, n;
        t = 0;
        n = 0;
        for(i=0;<cd->numTracks;i++){
                // shift left and create a MSB length thats not exact
                t += cd->track[i].lengthMs;
                n += cd->track[i].beginMs + cd->track[i].endMs;
                }
                cid->id[0] = t< < 10 +cd-<numTracks;
                cid->id[1] = n;
}
void main(void)
{
        short i;
        short matchtest;
        // create global structures for two complete cds with up to 100 tracks
        cd cd2id;
        cdid cd2UID;
        cd cdFromDB;
        cdid cdFromDBUID;
        printf ("Test #1 will compare two cd that are exactly the same\n\n");
        // put in some test values for the cd track lengths
        // since thes are in ms, its basically 60000 = 1 minutes
        cd2id.track[0].beginMs = 0;
        cd2id.track[1].beginMs = 100001;
        cd2id.track[2].beginMs = 231001;
        cd2id.track[3].beginMs = 345001;
        cd2id.track[4].beginMs = 435001;
        cd2id.track[5].beginMs = 460001;
        cd2id.track[6].beginMs = 590001;
        cd2id.track[0].endMs = 100000;
        cd2id.track[1].endMs = 231000;
        cd2id.track[2].endMs = 345000;
        cd2id.track[3].endMs = 435000;
        cd2id.track[4].endMs = 460000;
        cd2id.track[5].endMs = 590000;
        cd2id.track[6].endMs = 690000;
        cd2id.track[0].lengthMs = cd2id.track[0].endMs − cd2id.track[0].beginMs;
        cd2id.track[1].lengthMs = cd2id.track[1].endMs − cd2id.track[1].beginMs;
        cd2id.track[2].lengthMs = cd2id.track[2].endMs − cd2id.track[2].beginMs;
        cd2id.track[3].lengthMs = cd2id.track[3].endMs − cd2id.track[3].beginMs;
        cd2id.track[4].lengthMs = cd2id.track[4].endMs − cd2id.track[4].beginMs;
        cd2id.track[5].lengthMs = cd2id.track[5].endMs − cd2id.track[5].beginMs;
        cd2id.track[6].lengthMs = cd2id.track[6].endMs − cd2id.track[6].beginMs;
        cd2id.numTracks = 7;
        for(i=1;i<cd2id.numTracks;i++){
                printf ("CD #1: Track = %d length inminutes =%f\n", i,
(float)cd2id.track[i].lengthMs/60000.0);
        }
        printf ("\n");
        cdFromDB.track[0].beginMs = 0;
        cdFromDB.track[1].beginMs = 100001;
        cdFromDB.track[2].beginMs = 231001;
        cdFromDB.track[3].beginMs = 345001;
        cdFromDB.track[4].beginMs = 435001;
        cdFromDB.track[5].beginMs = 460001;
        cdFromDB.track[6].beginMs = 590001;
        cdFromDB.track[0].endMs = 100000;
        cdFromDB.track[1].endMs = 231000;
        cdFromDB.track[2].endMs = 345000;
        cdFromDB.track[3].endMs = 435000;
```

APPENDIX B-continued

```
        cdFromDB.track[4].endMs = 460000;
        cdFromDB.track[5].endMs = 590000;
        cdFromDB.track[6].endMs = 690000;
        cdFromDB.track[0].lengthMs = cd2id.track[0].endMs – cd2id.track[0].beginMs;
        cdFromDB.track[1].lengthMs = cd2id.track[1].endMs – cd2id.track[1].beginMs;
        cdFromDB.track[2].lengthMs = cd2id.track[2].endMs – cd2id.track[2].beginMs;
        cdFromDB.track[3].lengthMs = cd2id.track[3].endMs – cd2id.track[3].beginMs;
        cdFromDB.track[4].lengthMs = cd2id.track[4].endMs – cd2id.track[4].beginMs;
        cdFromDB.track[5].lengthMs = cd2id.track[5].endMs – cd2id.track[5].beginMs;
        cdFromDB.track[6].lengthMs = cd2id.track[0].endMs – cd2id.track[6].beginMs;
        cdFromDB.numTracks = 7;
        for(i=1; i<cdFromDB.numTracks;i++){
                printf("CD #2: Track = %d length inminutes = %f\n", i,
(float)cdFromDB.track[i].lengthMs/60000.0);
        }
        CreateUniqueId( &cd2UID, &cd2id );
        printf("Unique ID for CD #1 = %d%d\n", cd2UID.id[0], cd2UID.id[1]);
        CreateUniqueId( &cdFromDBUID, &cdFromDB );
        printf( "Unique ID for CD #2 = %d%d\n", cdFrom DBUID.id[0],
cdFromDBUID.id[1]);
        matchtest = (cd2UID.id[0]== cdFromDBUID.id[0]) && (cd2UID.id[1] ==
cdFromDBUID.id[1]);
        printf ("The cd's match if result is non zero matchresult=%d",matchtest);
        printf ("\n");
        printf ("\n");
        printf ("Test #2 will compare two cd that are nearly the same\nexcept they have
diffent # of tracks \n");
        // put in some test values for the cd track lengths
        // since thes are in ms, its basically 60000 = 1 minute
        cd2id.track[0].beginMs = 0;
        cd2id.track[1].beginMs = 100001;
        cd2id.track[2].beginMs = 231001;
        cd2id.track[3].beginMs = 345001;
        cd2id.track[4].beginMs = 435001;
        cd2id.track[5].beginMs = 460001;
        cd2id.track[6].beginMs = 590001;
        cd2id.track[0].endMs = 100000;
        cd2id.track[1].endMs = 231000;
        cd2id.track[2].endMs = 345000;
        cd2id.track[3].endMs = 435000;
        cd2id.track[4].endMs = 460000;
        cd2id.track[5].endMs = 590000;
        cd2id.track[6].endMs = 690000;
        cd2id.track[0].lengthMs = cd2id.track[0].endMs – cd2id.track[0].beginMs;
        cd2id.track[1].lengthMs = cd2id.track[1].endMs – cd2id.track[1].beginMs;
        cd2id.track[2].lengthMs = cd2id.track[2].endMs – cd2id.track[2].beginMs;
        cd2id.track[3].lengthMs = cd2id.track[3].endMs – cd2id.track[3].beginMs;
        cd2id.track[4].lengthMs = cd2id.track[4].endMs – cd2id.track[4].beginMs;
        cd2id.track[5].lengthMs = cd2id.track[5].endMs – cd2id.track[5].beginMs;
        cd2id.track[6].lengthMs = cd2id.track[6].endMs – cd2id.track[6].beginMs;
        cd2id.numTracks = 7;
        for(i=1;1<cd2id.numTracks;i++){
                printf ("CD #1: Track =%d length inminutes = %f\n", i,
(float)cd2id.track[i].lengthMs/60000.0);
        }
        printf ("\n");
        cdFromDB.track[0].beginMs = 0;
        cdFromDB.track[1].beginMs = 100001;
        cdFromDB.track[2].beginMs = 231001;
        cdFromDB.track[3].beginMs = 345001;
        cdFromDB.track[4].beginMs = 435001;
        cdFromDB.track[5].beginMs = 460001;
        cdFromDB.track[6].beginMs = 590001;
        cdFromDB.track[0].endMs = 100000;
        cdFromDB.track[1].endMs = 231000;
        cdFromDB.track[2].endMs = 345000;
        cdFromDB.track[3].endMs = 435000;
        cdFromDB.track[4].endMs = 460000;
        cdFromDB.track[5].endMs = 590000;
        cdFromDB.track[0].lengthMs = cd2id.track[0].endMs – cd2id.track[0].beginMs;
        cdFromDB.track[1].lengthMs = cd2id.track[1].endMs – cd2id.track[1].beginMs;
        cdFromDB.track[2].lengthMs = cd2id.track[2].endMs – cd2id.track[2].beginMs;
        cdFromDB.track[3].lengthMs = cd2id.track[3].endMs – cd2id.track[3].beginMs;
        cdFromDB.track[4].lengthMs = cd2id.track[4].endMs – cd2id.track[4].beginMs;
        cdFromDB.track[5].lengthMs = cd2id.track[5].endMs – cd2id.track[5].beginMs;
        cdFromDB.numTracks = 6;
        for(i=1;i<cdFromDB.numTracks;i++){
                printf ("CD #2: Track = %d length inminutes = %f\n", i,
(float)cdFromDB.track[i].lengthMs/60000.0 );
```

APPENDIX B-continued

```
      }
      CreateUniqueId( &cd2UID, &cd2id );
      printf( "Unique ID for CD #1 = %d%d\n", cd2UID.id[0], cd2UID.id[1]);
      CreateUniqueID( &cdFromDBUID, &cdFromDB );
      printf( "Unique ID for CD #2 = %d%d\n", cdFromDBUID.id[0],
cdFromDBUID.id[1]);
      matchtest = (cd2UID.id[0] == cdFromDBUID.id[0]) && (cd2UID.id[1] ==
cdFromDBUID.id[1]);
      printf ("The cd's match if result is non zero matchresult=%d",matchtest);
      printf ("\n");
      printf ("\n");
}
```

We claim:

1. A method for synchronizing delivery of visual content from a first computer to a second computer with playing of a musical recording on the second computer, the first and second computers connected by a computer network and said method comprising:

activating a computer program based on information transferred over the computer network from the first computers;

reporting, via the computer program and the computer network to the first computers, a first position indicator identifying a position on a musical recording currently being played on the second computer, the first position indicator including an identification of a track on the musical recording and a current playback time within the track;

delivering a unit of visual content to the second computer via the computer network, the unit of visual content corresponding to at least one frame of visual information and to the position information;

following receipt of the unit of visual content, determining a second position indicator identifying a second position on the musical recording; and displaying the unit of visual content if the unit of visual content corresponds approximately to the second position indicator.

* * * * *

UNITED STATES PATENT AND TRADEMARK OFFICE
CERTIFICATE OF CORRECTION

PATENT NO.: 5,987,525
DATED : November 16, 1999
INVENTOR(S): Dale T. ROBERTS et al.

It is certified that errors appear in the above-identified patent and that said Letters Patent is hereby corrected as shown below:

Col. 3, line 6, change "Bemers-Lee" to --Berners-Lee--.

Col. 5, line 37, change "malting" to --making--.

Col. 6, line 5, change "Append ontains" to --Appendix B contains--.

Col. 11, line 9, change "*cdPtr;" to --*cdTrackPtr;--.

Col. 13, line 10, change "cd2id.track[0].endMs" to --cd2id.track[6].endMs--.

Col. 15, line 25, change "computers" to --computer--.

Signed and Sealed this

Twelfth Day of September, 2000

Attest:

Q. TODD DICKINSON

Attesting Officer

Director of Patents and Trademarks